(12) United States Patent
McMahon et al.

(10) Patent No.: US 9,447,700 B2
(45) Date of Patent: Sep. 20, 2016

(54) THERMALLY FREE HANGER WITH LENGTH ADJUSTMENT FEATURE

(71) Applicant: United Technologies Corporation, Hartford, CT (US)

(72) Inventors: Shawn M. McMahon, Agawan, MA (US); Jeffrey R. Lavin, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 253 days.

(21) Appl. No.: 14/179,739

(22) Filed: Feb. 13, 2014

(65) Prior Publication Data

US 2014/0230246 A1 Aug. 21, 2014

Related U.S. Application Data

(60) Provisional application No. 61/766,444, filed on Feb. 19, 2013.

(51) Int. Cl.
| | |
|---|---|
| *B25B 1/20* | (2006.01) |
| *F01D 25/28* | (2006.01) |
| *F02K 1/80* | (2006.01) |
| *F02K 1/82* | (2006.01) |
| *F16B 5/02* | (2006.01) |
| *F16B 37/04* | (2006.01) |

(52) U.S. Cl.
CPC ............. *F01D 25/28* (2013.01); *F02K 1/80* (2013.01); *F02K 1/822* (2013.01); *F16B 5/0233* (2013.01); *F16B 37/041* (2013.01); *Y02T 50/675* (2013.01); *Y10T 29/4932* (2015.01)

(58) Field of Classification Search
USPC ........................................ 269/37, 40, 43, 44
See application file for complete search history.

(56) References Cited

U.S. PATENT DOCUMENTS

| 4,180,972 | A |   | 1/1980  | Herman et al. |
| 4,555,901 | A |   | 12/1985 | Wakeman et al. |
| 4,748,806 | A | * | 6/1988  | Drobny ............. F02K 1/80 403/259 |
| 5,129,447 | A | * | 7/1992  | Hamner ............. F02K 1/80 165/134.1 |
| 5,275,529 | A | * | 1/1994  | Langenbrunner ....... F02C 7/045 244/132 |
| 5,292,227 | A |   | 3/1994  | Czachor et al. |
| 5,323,601 | A |   | 6/1994  | Jarrell et al. |
| 5,704,208 | A |   | 1/1998  | Brewer et al. |
| 6,163,959 | A |   | 12/2000 | Arraitz et al. |
| 6,672,833 | B2 |  | 1/2004  | MacLean et al. |
| 7,339,244 | B2 |  | 3/2008  | Subramanian et al. |
| 8,668,441 | B2 | * | 3/2014  | Vauchel ............. B64D 29/08 415/119 |
| 2012/0233845 | A1 |   | 9/2012  | Gerengi |

* cited by examiner

*Primary Examiner* — Joseph J Hail
*Assistant Examiner* — Shantese McDonald
(74) *Attorney, Agent, or Firm* — Kinney & Lange, P.A.

(57) ABSTRACT

A system for connecting spaced components of a gas turbine engine includes connecting one end of a T-bar to each of the spaced components. One component is attached to the crossbar portion of the T-bar by trapping the crossbar between the component and a bracket. The second component is attached to the shaft portion using a hanger nut connected to the shaft portion of the T-bar and bolted to the second component. The system may be installed by attaching the crossbar portion, then advancing the first component towards the second component until the shaft portion passes through an aperture in the second component. The hanger nut is attached to the shaft portion and the second component.

9 Claims, 5 Drawing Sheets

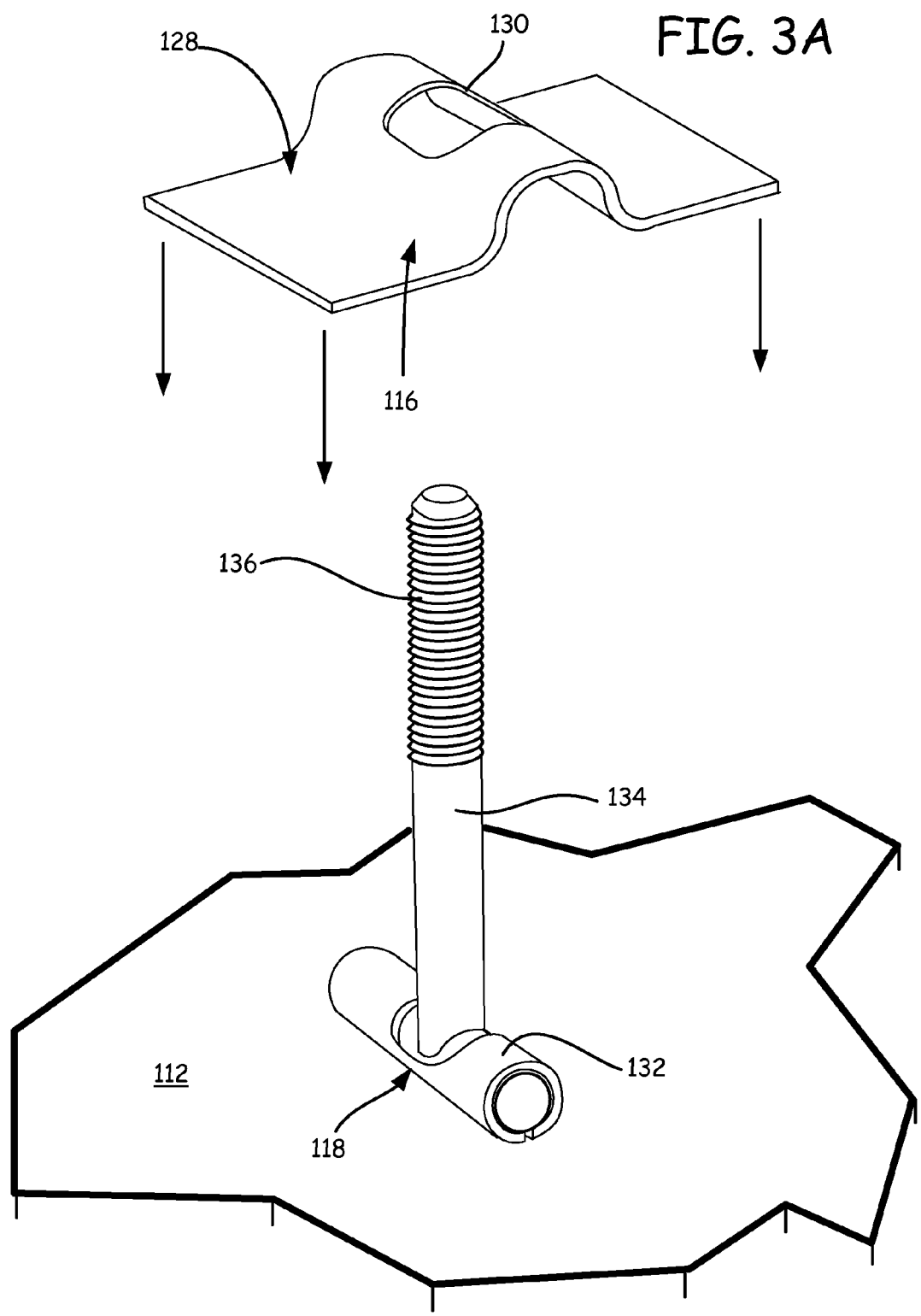

THERMALLY FREE HANGER WITH LENGTH ADJUSTMENT FEATURE

CROSS-REFERENCE TO RELATED APPLICATION

This application claims priority to U.S. provisional application Ser. No. 61/766,444, entitled "THERMALLY FREE HANGER WITH LENGTH ADJUSTMENT FEATURE," filed Feb. 19, 2013, which is hereby incorporated by reference in its entirety.

BACKGROUND

Gas turbine engines operate at high temperatures and pressures, necessitating structures that can operate under extreme conditions. For example, in the exhaust section of a gas turbine engine, high temperature exhaust gases are often vented through a shaped liner. The liner section is typically made of a material capable of enduring high temperatures, and often incorporates cooling features such as effusion holes or slots. Nonetheless, such liners often heat to several hundred degrees above ambient conditions, and can deform due to thermal expansion and pressure loads.

As such, the liner has typically been separated from structural components surrounding it using fasteners. These structural components may, in combination with the liner, form a cooling air plenum. Fasteners pass through cooling air plena to connect liners to structural components.

SUMMARY

A system for fastening first and second spaced components in a gas turbine engine includes a T-bar, a hanger nut, a cap, and a bracket. The T-bar has a shaft portion and a crossbar portion. The shaft portion of the T-bar passes through an aperture in the first spaced component and the crossbar portion of the T-bar is arranged adjacent to the second spaced component. The hanger nut is configured to capture the shaft portion of the T-bar. The cap nut is configured to attach the hanger nut and the shaft portion of the T-bar to the first spaced component. The bracket is coupled to the second spaced component and captures the crossbar portion of the T-bar with sufficient head space to permit limited movement of the crossbar portion.

A method for connecting components in a gas turbine engine includes arranging a T-bar having a shaft and a crossbar portion such that the shaft portion protrudes through an aperture in a first spaced component and the crossbar portion is adjacent to a second spaced component. A bracket is attached to the second spaced component to capture the crossbar portion between the second spaced component and the bracket, a hanger nut is arranged adjacent to the T-bar and the first spaced component. The hanger nut is attached to the first spaced component by inserting a bolt through an aperture and the bolt hole in the first spaced component. A cap is attached to a threaded portion of the shaft portion of the T-bar.

A method of installing a liner in a gas turbine engine includes inserting a crossbar portion of a T-bar between a liner and a bracket to substantially encapsulate the crossbar portion between the liner and the bracket, the T-bar including the crossbar portion and an integrally formed shaft portion transecting the crossbar portion at a midsection. The bracket is affixed to the liner. The liner is advanced towards a structure, the structure having an aperture, such that a shaft portion of the T-bar passes through the aperture. A hanger nut is inserted into the aperture, such that the hanger nut circumscribes the shaft portion of the T-bar and is connected to the T-bar by a threaded connection. The hanger nut is bolted to the structural component.

BRIEF DESCRIPTION OF THE DRAWINGS

FIGS. 3A-3E are cross-sectional views of the fastener of FIG. 2 in varying stages of installation.

DETAILED DESCRIPTION

Figure 1:
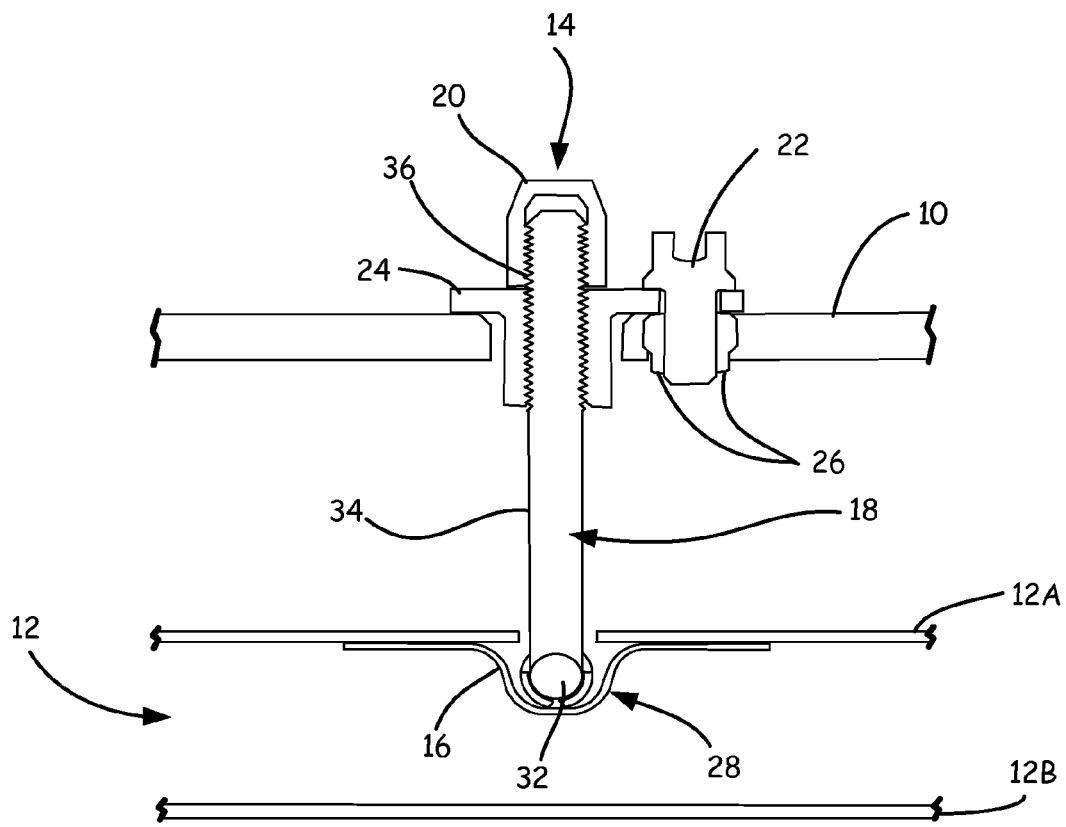
FIG. 1 is a cross-sectional view of a fastener connecting a liner to a duct.

FIG. 1 is a cross-sectional view of first spaced component 10 connected to second spaced component 12 by fastener 14. Second spaced component 12 includes outer liner 12A and inner liner 12B. Fastener 14 includes bracket 16, T-bar 18, cap 20, bolt 22, hanger nut 24, and duct inserts 26. Bracket 16 includes recessed portion 28. T-bar 18 includes crossbar portion 32, shaft portion 34, and threaded portion 36.

First spaced component 10 of FIG. 1 is a structural component of a gas turbine engine, such as a duct wall. In alternative embodiments, first spaced component 10 may be any other component which is spaced from another component.

Second spaced component 12 is a component which is spaced a desired distance from first spaced component 10. As shown in FIG. 1, second spaced component 12 is a liner of a gas turbine engine. In particular, second spaced component 12 is a dual wall liner having outer liner 12A and inner liner 12B. Dual wall liners are used in a variety of existing gas turbine engine designs. In such designs, outer liner 12A and inner liner 12B are connected via connectors (not shown). Second spaced component 12 may have cooling features, such as effusion holes, cooling slots, or diffusion holes (not shown), among others. Second spaced component 12 is often made of a material which is capable of withstanding high temperature and pressure. For example, second spaced component 12 may be made of a high temperature superalloy. Second spaced component 12 may be an individual liner panel, which may be arranged in combination with other liner panels (not shown) in order to define a combustion chamber. In other embodiments, second spaced component 12 may be shaped annularly to define an interior combustion chamber.

Fastener 14 is a device that connects two spaced components. Here, fastener 14 is a device that connects first spaced component 10 to second spaced component 12, while keeping a desired spacing or distance between those two components.

Bracket 16 is a part of fastener 14. Bracket 16 is a sheet-like piece of material. Bracket 16 is capable of fastening to second spaced component 12, as by welding, brazing, riveting, or attachment by other fasteners. Bracket 16 includes recessed portion 28. Recessed portion 28 may be a section separated from second spaced component 12 by a desired distance.

T-bar 18 is a part of fastener 14. T-bar 18 includes crossbar portion 32, shaft portion 34, and threaded portion 36. T-bar 18 may be a commercially available T-bar. T-bars are widely used in commerce and are generally inexpensive and structurally strong. Crossbar portion 32 is a portion of T-bar 18 which extends primarily perpendicular to shaft portion 34. Shaft portion 34 terminates at crossbar portion 32 on one end and at threaded portion 36 at its other end. Threaded portion 36 is a section of T-bar 18 which is threaded to receive other compatibly threaded components.

Cap 20, bolt 22, hanger nut 24, and duct inserts 26 are all components configured to receive other compatible components. As shown in FIG. 1, cap 20 is a cap nut with threading configured to be received by other compatibly threaded components. Bolt 22 may be a standard or commercially available bolt. Hanger nut 24 may also be commercially available, and contains threading to interface with a compatibly threaded component. In alternative embodiments, cap 20 may be any other fastener capable of attaching to a threaded portion.

First spaced component 10 is attached to second spaced component 12 by fastener 14. Bracket 16 traps T-bar 18 to outer liner 12A, while leaving limited space to allow limited movement of T-bar 18. In particular, recessed portion 28 surrounds crossbar portion 32. Threaded portion 36 is captured by cap 20, which threads onto threaded portion 36 until it is snug against hanger nut 24. Hanger nut 24 is attached to first spaced component 10 by bolt 22, which passes through an aperture in hanger nut 24 and between duct inserts 26. Hanger nut 24 also contains threading to capture threaded portion 36. Duct inserts 26 are affixed to first spaced component 10.

Because T-bar 18 may not move relative to first spaced component 10, and has defined, limited freedom to move with respect to second spaced component 12, fastener 14 maintains a desired spacing relationship between first spaced component 10 and second spaced component 12.

Figure 2:
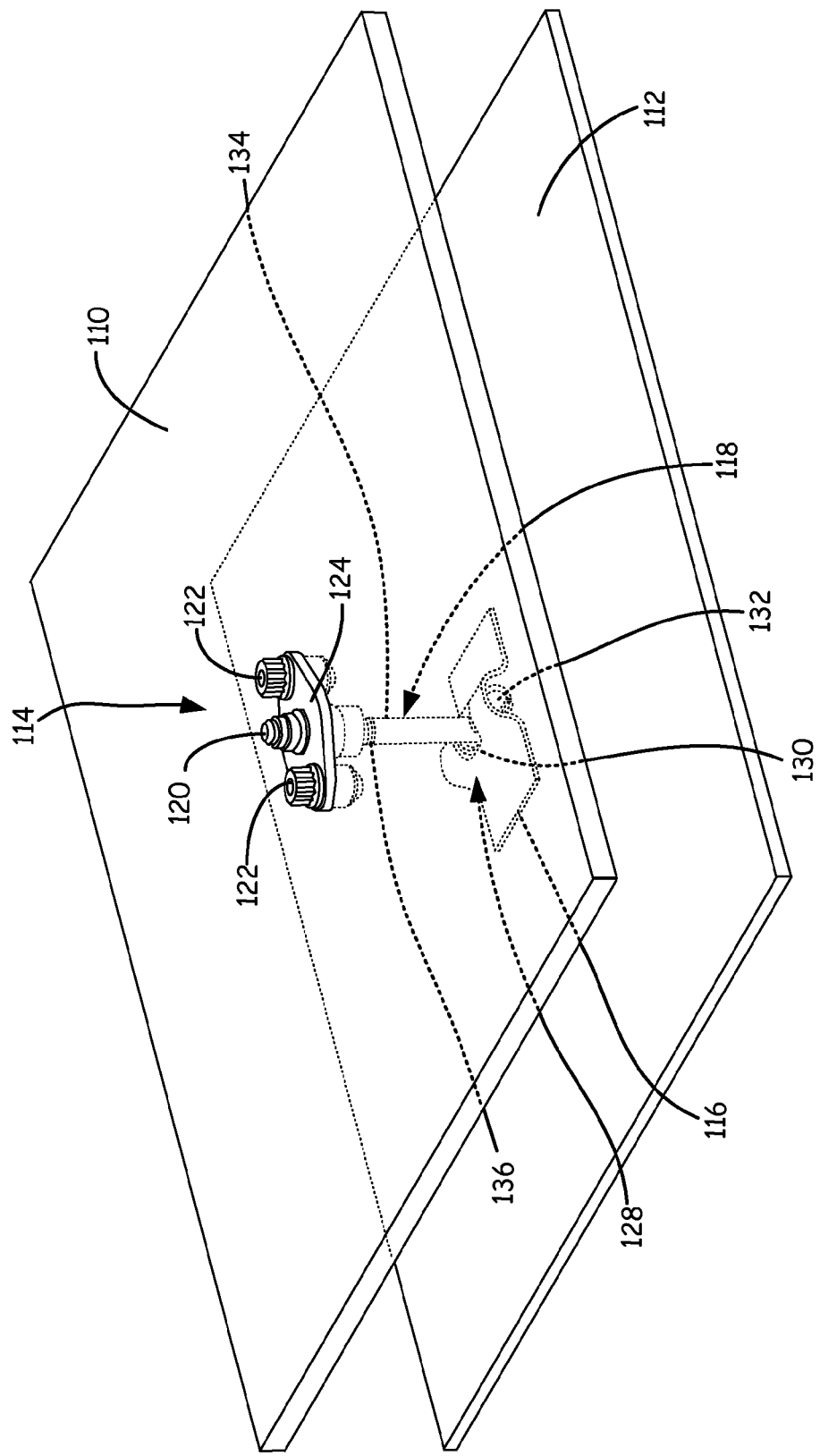
FIG. 2 is a perspective view of a fastener connecting a first spaced component to a second spaced component.

FIG. 2 is a perspective view showing first spaced component 110 and second spaced component 112, connected by fastener 114. In the embodiment shown in FIG. 2, first spaced component 110 need not be a duct, and second spaced component 112 need not be a liner, but each component may be any component which is to be held at a desired spacing relationship from the other.

First spaced component 110 is connected to second spaced component 112 by fastener 114. Second spaced component 112 is attached to bracket 116, as by welding, brazing, or any other method of attachment by fasteners known to those skilled in the art. Recessed portion 128 confines crossbar 132 of T-bar 118 against second spaced component 112. Bracket 116 also includes cutout 130. Cutout 130 may be an aperture in bracket 116, often located within recessed portion 128. Shaft portion 134 passes through cutout 130. First spaced component 110 is attached to the opposite end of T-bar 118, at threaded portion 136. Cap 120 captures threaded portion 136, and bolts 122 pass through hanger nut 124 into duct inserts (such as duct inserts 26 of FIG. 1), which are affixed to first spaced component 110. T-bar 118 may either pass through or be threaded through hanger nut 124. Thus, T-bar 118 is coupled with both first spaced component 110 and second spaced component 112, and the distance between first spaced component 110 and second spaced component 112 is directly related to the dimensions of T-bar 118 as well as the degree of freedom of crossbar portion 132 to move within recessed portion 128.

By modifying the size of recessed portion 128, as well as the size of cutout 130, crossbar 132 may be constrained to a desired amount of movement in any given direction. First spaced component 110 and nearby components, such as bracket 116 and/or T-bar 118, may undergo thermal expansion, depending on the use of fastener 114. Fastener 114 holds second spaced component 112 at a desired distance from first spaced component 110, with a desired quantity of slack based on the size of recessed portion 128 and cutout 130 compared to crossbar portion 132.

Fastener 114 incorporates many commercially available components, such as T-bar 118, cap 120, bolts 122, and inserts 126 (FIGS. 3B-3E). Thus, fastener 114 significantly reduces cost and difficulty in designing unique fasteners. Further, fastener 114 maintains a desired distance between first spaced component 110 and second spaced component 112 using relatively simple parts, as compared to previously used fasteners.

FIGS. 3A-3E show the process of assembling fastener 114 to maintain a desired distance between first spaced component 110 and second spaced component 112.

FIG. 3A shows bracket 116 being attached to second spaced component 112. Bracket 116 traps crossbar portion 132 of T-bar 118 to second spaced component 112. T-bar 118 is laced through cutout 130, and bracket 116 is moved towards second spaced component 112 until crossbar portion 132 is contained between recessed portion 128 and second spaced component 112. Bracket 116 may be fastened to second spaced component 112 by brazing, welding, riveting, adhering, or any other fastening method.

Figure 3B:
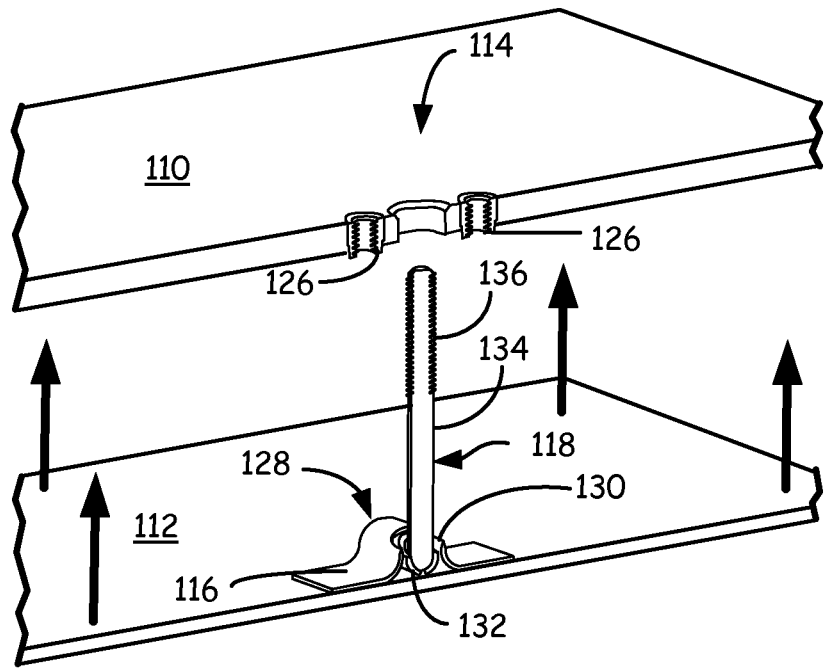

FIG. 3B shows bracket 116 attached to second spaced component 112. Crossbar portion 132 is positioned between second spaced component 112 and bracket 116, such movement of T-bar 118 is limited to the space defined by recessed portion 128 and second spaced component 112. T-bar 118 extends through cutout 130 towards first spaced component 110. As shown in FIG. 3B, second spaced component 112 is moved towards first spaced component 110. In alternative embodiments, first spaced component 110 may be moved, for example. Such movement results in T-bar 118 approaching first spaced component 110. First spaced component 110 contains a series of apertures, including one aperture through which T-bar 118 passes. Other apertures are lined with inserts 126, which are threaded to first spaced component 110. Commercially available inserts 126 include external threads and anti-rotation stakes.

Figure 3C:
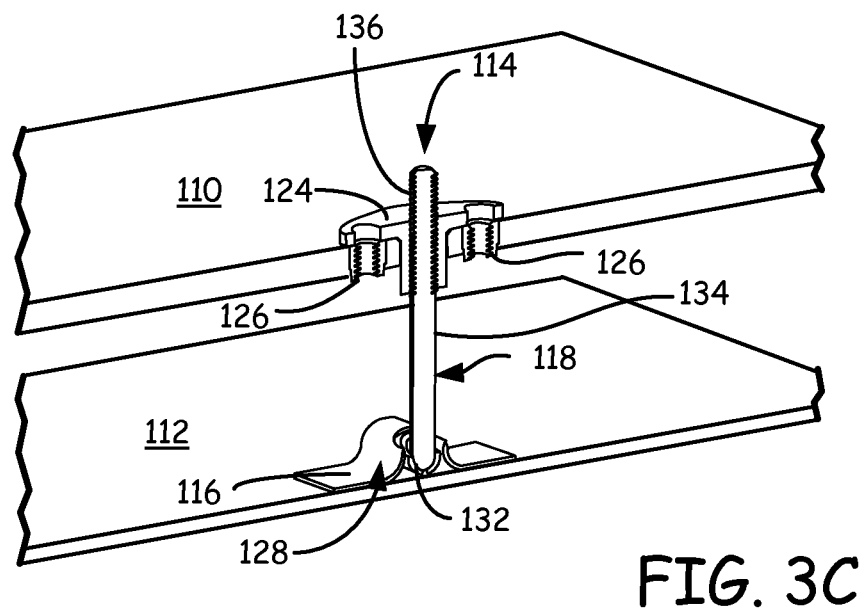

FIG. 3C shows fastener 114 connecting first spaced component 110 to second spaced component 112 of FIG. 3B, and further shows hanger nut 124. Hanger nut 124 threads on to threaded portion 136 so that T-bar 118 may not be inadvertently moved relative to hanger nut 124. Hanger nut 124 is threaded until bolt holes in hanger nut 124 align with the apertures in first spaced component 110 and hanger nut 124 is at a desired distance from second spaced component 112.

Figure 3D:
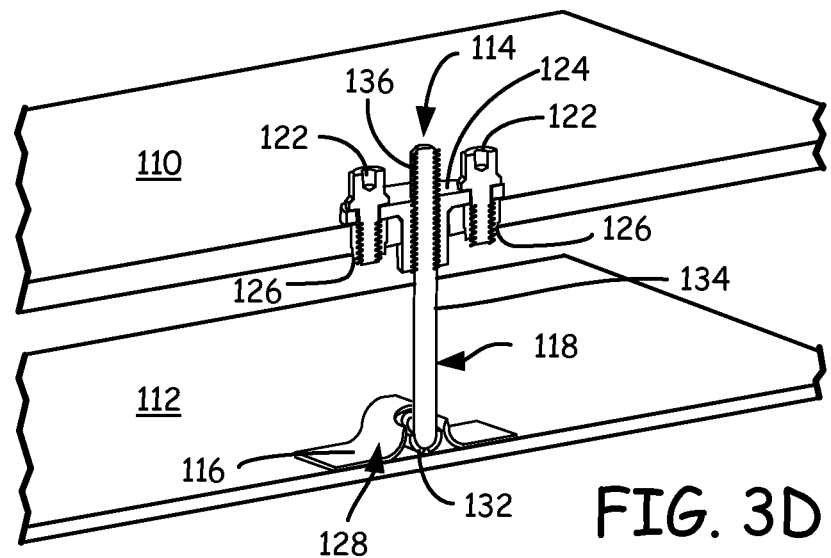

FIG. 3D shows fastener 114 connecting first spaced component 110 to second spaced component 112 of FIG. 3C, and further shows bolts 122 connecting hanger nut 124 to first spaced component 110 via inserts 126.

Figure 3E:
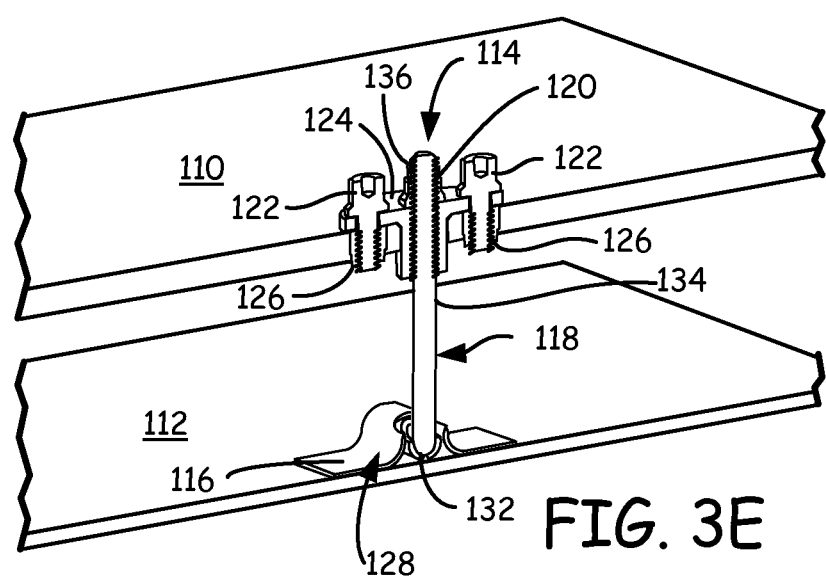

FIG. 3E further shows cap nut 120 attached to T-bar 118 to further prevent inadvertent movement of T-bar 118 relative to hanger nut 124.

Listing of Potential Embodiments

A system for fastening two spaced components in gas turbine engine includes a first spaced component, a second spaced component arranged a desired distance from the first spaced component, a T-bar having a shaft portion and a crossbar portion, the T-bar including the crossbar portion and an integrally formed shaft portion transecting the crossbar portion at a midsection wherein the shaft portion of the T-bar passes through an aperture in the first spaced component and the crossbar portion of the T-bar is arranged adjacent to the second spaced component, a hanger nut configured to capture the shaft portion of the T-bar, a cap nut configured to attach the hanger nut and the shaft portion of the T-bar to the first spaced component, and a bracket, wherein the bracket is coupled to the second spaced component and captures the crossbar portion of the T-bar with sufficient head space to permit limited movement of the crossbar portion.

The first spaced component and the second spaced component may be separated by a distance determined by the dimensions of the T-bar. The bracket may be coupled with the second spaced component by welding. The bracket may be coupled with the second spaced component using a plurality of bolts. The shaft of the T-bar may be threaded, and the cap nut may be configured to screw on to the threading. The hanger nut may include at least one tab including a bolt passage. The system may also include a bolt passing through each bolt passage, and may include a duct insert arranged within the first spaced component for each both, each duct insert configured to capture the bolt. The system may include a structural component as the first spaced component, and a liner of a gas turbine engine as the second spaced component.

A method for connecting components in a gas turbine engine includes arranging a T-bar having a shaft and a crossbar portion such that the shaft portion protrudes through an aperture in a first spaced component and the crossbar portion is adjacent to a second spaced component, attaching a bracket to the second spaced component to capture the crossbar portion between the second spaced component and the bracket, arranging a hanger nut adjacent to the T-bar and the first spaced component, the hanger nut having an aperture, such that the aperture is adjacent to a bolt hole in the first spaced component, attaching the hanger nut to the first spaced component by inserting a bolt through the aperture and the bolt hole, and attaching a cap nut to a threaded portion of the shaft portion of the T-bar.

The method may include attaching the bracket to the second spaced component by welding the bracket to the second spaced component with sufficient head space to permit limited movement of the crossbar portion. The method may include attaching the bracket to the second spaced component by riveting the bracket to the second spaced component with sufficient head space to permit limited movement of the crossbar portion. The hanger nut may have a quantity of apertures, the first spaced component may have a quantity of bolt holes, and each aperture may be arranged adjacent to a bolt hole.

A method of installing a liner in a gas turbine engine comprises inserting a crossbar portion of a T-bar between a liner and a bracket to substantially encapsulate the crossbar portion between the liner and the bracket, the T-bar including the crossbar portion and an integrally formed shaft portion transecting the crossbar portion at a midsection, affixing the bracket to the liner, advancing the liner towards a structure, the structure having an aperture, such that a shaft portion of the T-bar passes through the aperture, inserting a hanger nut into the aperture, such that the hanger nut circumscribes the shaft portion of the T-bar, and bolting the hanger nut to the structural component.

The method may further comprise inserting a duct insert in a bolt hole in the structural component. The method may further comprise passing a bolt through the duct insert and the hanger nut to connect the structural component to the hanger nut. The bolts may connect the structural component to the hanger nut. The method may further comprise attaching a cap nut to a threaded portion of the shaft portion of the T-bar, such threaded portion extending through the aperture in the structural component. Affixing the bracket to the liner may include capturing the crossbar portion of the T-bar between the bracket and the liner, with sufficient head space to permit limited movement of the crossbar portion.

Although the present invention has been described with reference to preferred embodiments, workers skilled in the art will recognize that changes may be made in form and detail without departing from the spirit and scope of the invention.

The invention claimed is:

1. A system for fastening first and second spaced components in a gas turbine engine, with the second spaced component arranged a desired distance from the first spaced component the system comprising:
   a T-bar having a shaft portion and a crossbar portion, wherein the shaft portion of the T-bar passes through a first aperture in the first spaced component and the crossbar portion of the T-bar is arranged adjacent to the second spaced component;
   a hanger nut configured to capture the shaft portion of the T-bar, wherein the hanger nut extends through the first spaced component;
   a cap nut configured to attach the hanger nut and the shaft portion of the T-bar to the first spaced component; and
   a bracket, wherein the bracket is coupled to the second spaced component and captures the crossbar portion of the T-bar with space between the bracket and the T-bar to permit movement of the crossbar portion with respect to the bracket and the second spaced component.

2. The system of claim 1, wherein the first spaced component and the second spaced component are separated by a distance determined by the dimensions of the T-bar.

3. The system of claim 1, wherein the bracket is coupled with the second spaced component using a plurality of bolts.

4. The system of claim 1, wherein the shaft of the T-bar is threaded.

5. The system of claim 4, wherein the cap nut is configured to screw on to the threading.

6. The system of claim 1, wherein the hanger nut includes at least one tab including a bolt passage.

7. The system of claim 6, and further comprising a bolt passing through the bolt passage.

8. The system of claim 7, and further comprising a duct insert arranged within the first spaced component for each bolt, each duct insert configured to capture the bolt.

9. The system of claim 1, wherein the first spaced component is a structural component of a gas turbine engine, and the second spaced component is a liner of a gas turbine engine.

* * * * *